United States Patent [19]

Keijsper

[11] Patent Number: 5,436,214
[45] Date of Patent: Jul. 25, 1995

[54] POLYMERIZATION PROCESS

[75] Inventor: Johannes J. Keijsper, Amsterdam, Netherlands

[73] Assignee: Shell Oil Company, Houston, Tex.

[21] Appl. No.: 23,427

[22] Filed: Feb. 23, 1993

Related U.S. Application Data

[62] Division of Ser. No. 833,203, Feb. 10, 1992, Pat. No. 5,227,464.

[30] Foreign Application Priority Data

Mar. 21, 1991 [NL] Netherlands ............ 9100503

[51] Int. Cl.$^6$ ............................................ B01J 31/00
[52] U.S. Cl. .................................. 502/159; 502/162; 502/167; 502/168
[58] Field of Search ............... 502/159, 162, 167, 168

[56] References Cited

U.S. PATENT DOCUMENTS

| | | | |
|---|---|---|---|
| 4,778,876 | 10/1988 | Doyle et al. ............... | 528/392 |
| 4,806,630 | 2/1989 | Drent et al. ............... | 528/392 |
| 4,843,144 | 6/1989 | Van Broekhoven et al. ...... | 528/392 |
| 4,851,582 | 7/1989 | Drent ................ | 502/167 X |
| 4,880,903 | 11/1989 | Van Broekhoven et al. ...... | 528/392 |
| 4,965,341 | 10/1990 | Van Doorn et al. ............ | 528/392 |
| 5,055,552 | 10/1991 | Wong ............... | 502/162 X |

FOREIGN PATENT DOCUMENTS

| | | |
|---|---|---|
| 0248483 | 12/1987 | European Pat. Off. . |
| 0272728 | 6/1988 | European Pat. Off. . |
| 0404228 | 12/1990 | European Pat. Off. . |
| 89-01311A | 5/1989 | Netherlands . |

*Primary Examiner*—Asok Pal
*Assistant Examiner*—E. D. Irzinski

[57] ABSTRACT

An improved gas-phase process for the production of linear alternating polymers of carbon monoxide and at least one ethylenically unsaturated hydrocarbon employs a novel supported catalyst wherein the physical properties and dimensions of the catalyst support exhibit a defined mathematical relationship. Specifically, the value obtained when the average particle size of the particulate catalyst support is raised to the power of the relative bulk density of the support should be less than 30.

11 Claims, No Drawings

POLYMERIZATION PROCESS

This is a division, of application Ser. No. 833,203, filed Feb. 10, 1992 and now U.S. Pat. No. 5,227,464.

FIELD OF THE INVENTION

This invention relates to an improved process for the production of linear alternating polymers of carbon monoxide and at least one ethylenically unsaturated hydrocarbon. More particularly, the invention relates to such a process conducted in the presence of a supported catalyst wherein the catalyst support has a defined mathematical ratio of physical dimensions and properties.

BACKGROUND OF THE INVENTION

The class of linear alternating polymers of carbon monoxide and at least one ethylenically unsaturated hydrocarbon is now well known in the art. Such polymers are broadly represented by the repeating formula

  (I)

wherein A is derived from a moiety of at least one ethylenically unsaturated hydrocarbon polymerized through the ethylenic unsaturation thereof.

A number of processes are known for producing such polymers which are now becoming known as polyketones or polyketone polymers. The processes typically involve the use of a catalyst composition formed from a compound of a Group VIII metal selected from palladium, cobalt or nickel, the anion of a strong non-hydrohalogenic acid and a bidentate ligand of phosphorus, nitrogen or sulfur. In van Broekhoven et al, U.S. Pat. No. 4,843,144, there is described a process for producing-linear alternating polymers of carbon monoxide and at least one ethylenically unsaturated hydrocarbon which employs a catalyst formed from a palladium salt, the anion of a non-hydrohalogenic acid having a pKa of below about 6 and a bidentate ligand of phosphorus. Van Broekhoven et al, U.S. Pat. No. 4,880,903 describe a process of producing polyketone terpolymers of carbon monoxide, ethylene and other ethylenically unsaturated hydrocarbons such as propylene. The process typically utilizes a catalyst composition formed from a compound of a Group VIII metal selected from palladium, cobalt or nickel, the anion of a strong non-hydrohalogenic acid and a bidentate ligand of phosphorus, arsenic or antimony. Similar processes using bidentate ligands of nitrogen are disclosed in U.S. Pat. No. 4,851,582 and processes using bidentate ligands of sulfur are described in U.S. Pat. No. 4,965,341.

The nature of the polyketone polymerization process is variable. The above van Broekhoven et al patents employ a catalyst composition which is homogeneous, i.e., soluble in the polymerization media which includes a reaction diluent. Alternatively, the polymerization catalyst may be heterogeneous wherein the catalyst composition is supported on a carrier which is substantially insoluble in the reaction mixture. U.S. Pat. No. 4,778,876 and U.S. Pat. No. 4,806,630 describe the use of supported catalyst compositions in gas-phase processes. U.S. Pat. No. 5,055,552 and copending U.S. patent application Ser. No. 716,487, filed Jun. 16, 1991, and now abandoned describe the use of supported catalysts in slurry-phase processes wherein the catalyst is produced by reaction of the catalyst components with the carrier. Although a variety of supports or carriers is used in such processes, there is no discussion within these references of any particular benefits to be gained by use of a support of any particular physical dimensions or properties.

The use of a supported catalyst broadly has certain benefits when such catalysts are used in gas-phase polymerization processes. Conducting the process in the gas phase with a supported catalyst avoids the processing steps such as filtration or centrifugation which are necessary when the polyketone polymer is produced in the presence of a homogeneous catalyst and a reaction diluent. It would be of advantage to provide an improved gas-phase process for the production of linear alternating polymers of carbon monoxide and at least one ethylenically unsaturated hydrocarbon which employs an improved supported polymerization catalyst.

SUMMARY OF THE INVENTION

The present invention provides an improved gas-phase process for the production of linear alternating polymers of carbon monoxide and at least one ethylenically unsaturated hydrocarbon. More particularly, the invention provides such a process which employs a catalyst wherein the support or carrier is characterized by a certain relationship of physical properties. The invention also relates to the novel supported catalyst.

DESCRIPTION OF THE INVENTION

The polyketone polymers which are produced according to the invention are of a linear alternating structure and contain substantially one molecule of carbon monoxide for each molecule of ethylenically unsaturated hydrocarbon. Suitable ethylenically unsaturated hydrocarbons for use as monomers in the polymerization process have up to 20 carbon atoms inclusive, preferably up to 10 carbon atoms inclusive, and are aliphatic such as ethylene and other α-olefins including propylene, 1-butene, isobutylene, 1-hexene, 1-octene and 1-dodecene, or are arylaliphatic containing an aromatic substituent on an otherwise aliphatic molecule, particularly an aromatic substituent on a carbon atom of the ethylenic unsaturation. Illustrative of this latter class of ethylenically unsaturated hydrocarbons is styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred terpolymers are produced by the process of the invention, there will be within the terpolymer at least about 2 units derived from ethylene for each unit derived from the second hydrocarbon. Preferably there will be from about 10 to about 100 units derived from ethylene for each unit derived from the second hydrocarbon. The polymer chain of the preferred polyketone polymers is therefore represented by the repeating formula

  (II)

wherein G is derived from the second ethylenically unsaturated hydrocarbon of at least 3 carbon atoms by polymerization through the ethylenic unsaturation thereof and the ratio of y:x is no more than about 0.5. When copolymers of carbon monoxide and ethylene are produced there will be no second hydrocarbon present and the copolymers are represented by the above formula II wherein y is zero. When y is other than zero, i.e., terpolymers are produced, the —CO—(—CH$_2$—CH$_2$—)— units and the —CO—(—G—)— units are found randomly throughout the polymer chain and the ratio of y:x is preferably from about 0.01 to about 0.1. The end groups or "caps" of the polymer chain will depend upon what materials were present during the production of the polymer and whether and how the polymer was purified. The precise nature of the end groups does not appear to influence the properties of the polymer to any considerable extent so that the polymers are fairly represented by the above formula for the polymer chain.

Of particular interest are the polyketone polymers of number average molecular weight from about 1,000 to about 200,000, particularly those of number average molecular weight from about 20,000 to about 90,000, as determined by gel permeation chromatography. The physical properties of such polymers will depend in part on the molecular weight of the polymer, whether the polymer is a copolymer or a terpolymer and, in the case of terpolymers, the nature of and the proportion of the second hydrocarbon present. Typical melting points for the polyketone polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, preferably from about 0.8 dl/g to about 4 dl/g.

The process for the production of polyketone polymers comprises contacting the carbon monoxide and ethylenically unsaturated hydrocarbon under polymerization conditions in the gas phase in the substantial absence of ,liquid reaction diluent in the presence of the particular supported catalyst of the invention. The supported catalyst comprises a catalyst support of defined physical character onto which has been impregnated a catalyst composition formed from a compound of palladium, an acid component and a bidentate ligand of phosphorus, nitrogen or sulfur. Although a variety of palladium compounds are useful precursors of the catalyst compositions of the invention, the preferred palladium compounds are palladium carboxylates and palladium acetate, palladium propionate, palladium butyrate and palladium hexanoate are satisfactory. Palladium acetate is particularly preferred.

The acid component of the catalyst composition is selected from a non-hydrohalogenic protic acid having a pKa of at least 2, a Lewis acid of the general formula MF$_n$ (III)

wherein n is 3 or 5 and M is a trivalent or pentavalent element of Group III of the Periodic Table of Elements which forms a binary fluoride, or a mixture of the Lewis acid and a hydrohalogenic acid such as hydrogen fluoride, hydrogen chloride or hydrogen bromide. Illustrative of protic acids are inorganic acids such as phosphoric acid and organic acids such as tartaric acid, citric acid and ascorbic acid. Of these, the use of citric acid is preferred. The Lewis acids suitably employed as the acid component are illustrated by boron trifluoride, aluminum trifluoride and antimony pentafluoride, of which boron trifluoride is preferred. Particularly useful as the acid component of the catalyst compositions are mixtures of the Lewis acids with from about 0.1 mol to about 10 mols, preferably from about 0.5 mol to about 5 mols, of hydrogen fluoride per mol of Lewis acid. Acid components of this type are illustrated by tetrafluoroboric acid, hexafluorophosphoric acid and hexafluoroantimonic acid. The use of tetrafluoroboric acid is particularly preferred. The quantity of the acid component to be employed in the catalyst compositions of the invention is from about 0.5 mol to about 200 moles of acid component per mol of palladium, preferably from about 1 mol to about 100 mols of acid component per mol of palladium. For the purposes of determining the quantity of acid component, when the preferred hydrohalogenic acid/Lewis acid mixtures are employed, only the amount of Lewis acid is used to determine the quantity of acid component.

The bidentate ligand of the catalyst composition is a bidentate ligand of phosphorus, nitrogen or sulfur. In the case of bidentate ligands of nitrogen, the preferred ligands are represented by the formula

(IV)

wherein X independently is an organic bridging group of up to 10 carbon atoms inclusive, with 3 or 4 atoms in the bridge at least two of which are carbon atoms. Illustrative of such ligands are 2,2'-bipyridine and 1,10-phenanthroline. When the catalyst composition is produced from a bidentate ligand of sulfur, the preferred sulfur bidentate ligands are represented by the formula

R—S—R$^1$—S—R (V)

wherein R independently is hydrocarbyl or substituted hydrocarbyl of up to 10 carbon atoms inclusive and R$^1$ is a divalent bridging group of up to 10 carbon atoms inclusive with from 2 to 4 carbon atoms inclusive in the bridge. R is aliphatic or aromatic and is hydrocarbyl or is substituted hydrocarbyl with any non-hydrocarbyl substituent being inert. Illustrative of suitable R groups are methyl, butyl, 5-chloropentyl, hexyl, phenyl, tolyl, 2-methoxyphenyl and 2,4-diethoxyphenyl. In the case of bidentate sulfur ligands of the above formula V the preferred R groups are straight-chain alkyl groups of up to 4 carbon atoms inclusive and benzyl. The R$^1$ linking group is preferably aliphatic hydrocarbyl, e.g., 1,2-ethylene, 1,3-propylene and 2,2-dimethyl-1,3-propylene. In the case of bidentate ligands of sulfur, the preferred R$^1$ group is 1,2-ethylene and the preferred bidentate sulfur ligands are 1,2-di(ethylthio)ethane and 1,2-di(benzylthio)ethane.

The bidentate ligands of phosphorus which are useful in the catalyst compositions of the invention are represented by the formula

(VI)

wherein R and R$^1$ have the previously stated meanings. In the case of bidentate phosphorus ligands, however, the preferred R group is aromatic and particularly phenyl or an aromatic group substituted with a polar group on a carbon atom ortho to the ring carbon atom through which the R group is attached to the phosphorus. Suitable substituted aromatic groups include 2-methoxyphenyl, 2,4-ethoxyphenyl, 2-cyanophenyl and 2,6-dimethoxyphenyl. The 2-methoxyphenyl group is particularly preferred. The preferred $R^1$ group in the case of the bidentate phosphorus ligands is preferably 1,3-propylene and the preferred bidentate phosphorus ligands are 1,3-bis(diphenylphosphino)propane and 1,3-bis[di(2-methoxyphenyl)phosphino]propane.

If the catalyst complexes of the invention contain a nitrogen or sulfur bidentate ligand, the quantity of the ligand should be from about 0.5 mol to about 700 mols of ligand per mol of palladium, particularly from about 1 mol to about 50 mols of ligand per mol of palladium. If a bidentate ligand of phosphorus is employed, the quantity of phosphorus ligand is usefully from about 0.5 mol to about 2 mols per mol of palladium. Preferred quantities of bidentate phosphorus ligand are from about 0.75 mol to about 1.5 mol per mol of palladium. Of the three types of bidentate ligand usefully incorporated within the catalyst compositions of the invention, the use of bidentate ligands of phosphorus is preferred.

It is useful on occasion to incorporate within the catalyst composition an organic oxidizing agent. Suitable agents include aliphatic nitrites such as butyl nitrite or hexyl nitrite, aromatic nitro compounds such as nitrobenzene and dinitrotoluene, and hydroquinones, both 1,2- and 1,4-hydroquinones. The aromatic nitro compounds and particularly nitrobenzene are preferred. As stated, the provision of oxidizing agent is optional and is not required, but provision of up to about 5,000 mols of oxidizing agent per mol of palladium is satisfactory. When organic oxidizing agent is present, an amount of oxidizing agent from about 10 mols to about 1,000 mols per mol of palladium is preferred.

The supported catalysts of the invention comprise a solid, particulate support which has been impregnated with the catalyst composition as by dissolving the composition in a suitable solvent, absorbing the resulting solution on the support and removing any excess of the solvent. Solvents which are useful for this purpose are those in which the catalyst composition is soluble and include alkanols such as methanol and ethanol and alkanones such as acetone and methyl ethyl ketone. To obtain a useful supported catalyst, it is not necessary to employ excess solvent or remove all solvent and advantages are obtained on occasion if a small amount of solvent remains on the supported catalyst. Sufficient solvent should be removed, if necessary, to provide a supported catalyst that appears "dry".

The precise chemical nature of the catalyst support is not critical to the practice of the process of the invention, provided that the physical dimensions and properties meet the criteria set forth below. Inorganic support materials are satisfactory including talc, silica and alumina. Also suitable are organic carriers such as cellulose, dextrose and dextran as well as polymeric materials such as polyethylene, polypropylene and polystyrene. The preferred catalyst support, however, is a preformed linear, alternating polymer of carbon monoxide and ethylenically unsaturated hydrocarbon which is the same as or is similar to the polymer whose production is desired by the gas-phase process of the invention. In a gas-phase process of this type, the polymer product is generally obtained after polymerization as a mixture with the supported catalyst. The separation of the polymer from the supported catalyst is conventionally accomplished as by dissolving the polymer in a suitable solvent and separating the resulting solution from the supported catalyst. When the support is a linear alternating polymer of the type being produced, however, such separation is usually unnecessary and the linear alternating product is usable as obtained from the polymerization process.

The catalyst supports of the invention do, however, exhibit a critical relationship of certain physical dimensions and properties. Specifically, the catalyst supports observe a critical relationship of average particle diameter and relative bulk density. As used herein, the term "d" measures the average particle size of the particulate support in microns. Suitable catalyst supports will have a value for d from about 1 micron to about 2,000 microns, preferably from about 10 microns to about 1,000 microns. As used herein, the term "R" measures the relative bulk density of the support. The relative bulk density is the quotient of the bulk density of the carrier and 0.6 times the density of the carrier, each measured in g/ml. Suitable R values are from about 0.05 to about 1.0, preferably from about 0.1 to about 0.9. The carrier index of the catalyst support, designated by the term "K" is calculated by raising the average particle size (in microns) to the relative bulk density power, i.e., $(d)^R$ in which d and R have the previously stated meaning. The carrier index of the catalyst support, has been found to be critical in determining the activity of a supported catalyst when used in the process of the invention. The improved supported catalysts of the invention have a carrier index below 30 and preferably below 25. Catalyst supports with a carrier index of 30 or above do not provide the improved yield of polymer and/or improved rate of polymer production obtained when catalysts having a carrier index below 30 are employed.

As stated, the supported catalysts are produced by impregnating the support with the catalyst composition components, provided together or separately. Sufficient catalyst composition is employed to provide from about $1 \times 10^{-7}$ mol to about $1 \times 10^{-3}$ mol of palladium per mol of total ethylenically unsaturated hydrocarbon to be polymerized. Preferred quantities of catalyst provide from abut $1 \times 10^{-6}$ mol to about $1 \times 10^{-4}$ mol of palladium per mol of total ethylenically unsaturated hydrocarbon.

The polymerization is conducted in the gas phase by contacting the carbon monoxide and unsaturated reactants in the presence of a catalytic quantity of the supported catalyst under polymerization conditions in the substantial absence of reaction diluent. It is, on occasion, useful to include within the reaction mixture a small quantity of molecular hydrogen or of alkanol, e.g., methanol, such as may result from incomplete removal of any methanol employed in impregnation of the catalyst support. The presence of such materials will likely serve to regulate the molecular weight of the polymer product. Typical polymerization conditions include a reaction temperature from about 25° C. to about 150° C., preferably from about 30° C. to about 130° C. The reaction pressure is usefully from about 2 bar to about 150 bar, but pressures from about 5 bar to about 100 bar are more often employed. The molar ratio of carbon monoxide to total ethylenically unsaturated reactant is suitably from about 10:1 to about 1:10, but preferably is from about 5:1 to about 1:5. The process is conducted batchwise, continuously or semi-continuously. The linear alternating polymer product is obtained as a mixture with the supported catalyst. In the preferred embodiment of the process where the catalyst support is a preformed linear alternating polymer, separation of the product and the catalyst support is not generally required. However, in the case of other catalyst supports the polymer product is separated and recovered, if desired, by conventional procedures, as by dissolving the polymer in a solvent in which the polymer is soluble but the support is insoluble, e.g., m-cresol or hexafluoroisopropanol. The polymer product is then recovered as by solvent removal.

The polyketone polymers are thermoplastic materials with relatively high molecular weight and are useful as engineering thermoplastics. The polyketones are processed by methods conventional for thermoplastics, such as extrusion, injection molding or thermoforming, into a variety of shaped articles of established utility. Illustrative of specific applications are the production of containers for food and drink and the production of parts and housings for automotive applications.

The invention is further illustrated by the following Comparative Examples (not of the invention) and the Illustrative Embodiments which should not be regarded as limiting. All polymers produced were examined by $^{13}$C-NNR and found to be linear in structure with units derived from carbon monoxide alternating with units derived from ethylene.

COMPARATIVE EXAMPLE I

A copolymer of carbon monoxide and ethylene was prepared using a catalyst formed by adsorbing a catalyst composition solution containing 1.5 ml methanol, 0.5 ml tetrahydrofuran, 0.0095 mmol palladium acetate, 0.024 mmol tetrafluoroboric acid and 0.0104 mmol 1,3-bis[di(2-methoxyphenyl)phosphino]propane on 8 g of a linear alternating polymer of carbon monoxide and ethylene with an average particle diameter of 900$\mu$ and a relative bulk density of 0.57. The carrier index, K, was 48. The catalyst was introduced to an autoclave of 300 ml capacity equipped with a mechanical stirrer. After the air in the autoclave had been removed by displacement with nitrogen, the contents of the autoclave were heated to 85° C. and an equimolar mixture of carbon monoxide and ethylene was introduced until a pressure of 50 bar was reached. Hydrogen was then added until a pressure of 55 bar was reached. During the resulting polymerization the pressure was maintained at 55 bar by further addition of the equimolar mixture. After four hours the polymerization was terminated by cooling the autoclave and contents to room temperature and releasing the pressure. The yield of copolymer was 30.3 g, obtained at a rate of 5.5 kg of copolymer/g Pd hr.

COMPARATIVE EXAMPLE II

A carbon monoxide/ethylene copolymer was obtained by a procedure substantially similar to that of Comparative Example I except that the carrier particle had an average diameter of 500$\mu$ and a relative bulk density of 0.57 (K=35), and the reaction time was 10 hours instead of 4 hours. The yield of copolymer was 80.1 g, obtained at a rate of 7.1 kg of copolymer/g Pd hr.

COMPARATIVE EXAMPLE III

A copolymer of carbon monoxide and ethylene was produced by a procedure substantially similar to that of Comparative Example I except that the carrier had an average particle diameter of 1300$\mu$ and a relative bulk density of 0.74. The value of K was 205. The yield of polymer was 12.9 g, obtained at a rate of 1.2 kg of copolymer/g Pd hr.

COMPARATIVE EXAMPLE IV

A copolymer of carbon monoxide and ethylene was produced by a procedure substantially similar to that of Comparative Example I except that the carrier polymer had an average particle diameter of 500$\mu$ and a relative bulk density of 0.73. The value for K was 93. The yield of copolymer was 15.4 g, obtained at a rate of 1.8 kg of copolymer/g Pd hr.

COMPARATIVE EXAMPLE V

A carbon monoxide/ethylene copolymer was produced by a procedure substantially similar to that of Comparative Example I except that the carrier was polypropylene particles having an average particle diameter of 500$\mu$ and a relative bulk density of 0174 (K=100), and the reaction time was 6 hours instead of 4 hours. The product was 8.6 g of a mixture of carbon monoxide/ethylene copolymer and polypropylene. The copolymer was obtained at a rate of 0.1 kg of copolymer/g Pd hr.

COMPARATIVE EXAMPLE VI

A copolymer of carbon monoxide and ethylene was produced by a procedure substantially similar to that of Comparative Example I except that the carrier polymer had an average particle diameter of 1000$\mu$ and a relative bulk density of 0.57 and the value of K was therefore 51. The reaction temperature was 90° C. instead of 85° C. and the reaction time was 5 hours instead of 4 hours. The yield of copolymer was 32.8 g obtained at a rate of 4.9 kg of copolymer/g Pd hr.

ILLUSTRATIVE EMBODIMENT I

A copolymer of carbon monoxide and ethylene was produced by a process substantially identical to that of Comparative Example I except that the carrier polymer had an average particle diameter of 275$\mu$ and a relative bulk density of 0.56. The value of K was therefore 23. The yield of polymer was 47.6 g, obtained at a rate of 9.8 kg of copolymer/g Pd hr.

ILLUSTRATIVE EMBODIMENT II

A carbon monoxide/ethylene copolymer was produced by a procedure substantially similar to that of Comparative Example I except that the carrier polymer had an average particle diameter of 200$\mu$ and a relative bulk density of 0.53 (K=16), and the reaction time was 10 hours instead of 4 hours. The yield of copolymer was 100.9 g, obtained at a rate of 9.2 kg of copolymer/g Pd hr.

ILLUSTRATIVE EMBODIMENT III

A carbon monoxide/ethylene copolymer was produced by a procedure substantially similar to that of Comparative Example I except that the carrier polymer had an average particle diameter of 200$\mu$ and a relative bulk density of 0.40. The value of K was therefore 8. The yield of copolymer was 60.1 g, obtained at a rate of 12.9 kg of copolymer/g Pd hr.

ILLUSTRATIVE EMBODIMENT IV

A copolymer of carbon monoxide and ethylene was produced by a procedure substantially similar to that of Comparative Example I, except that the carrier polymer had an average particle diameter of 200μ and a relative bulk density of 0.36. The value of K was therefore 7. The yield of copolymer was 54.9 g, produced at a rate of 11.6 kg of copolymer/g Pd hr.

ILLUSTRATIVE EMBODIMENT V

A carbon monoxide/ethylene copolymer was produced by a procedure substantially similar to that of Comparative Example I except that the carrier polymer had an average diameter of 200μ and a relative bulk density of 0.14. The value of R was 7. The yield of copolymer was 50.4 g, obtained at a rate of 10.5 kg of copolymer/g Pd hr.

ILLUSTRATIVE EMBODIMENT VI

A copolymer of carbon monoxide and ethylene was produced by a procedure substantially similar to that of Comparative Example I except that the carrier was polypropylene particles having an average particle diameter of 500μ and a relative bulk density of 0.51. The value for K was 24. The product was 15.7 g of a mixture of carbon monoxide/ethylene copolymer and polypropylene. The copolymer was produced at a rate of 1.9 kg of copolymer/g Pd hr.

ILLUSTRATIVE EMBODIMENT VII

A carbon monoxide/ethylene copolymer was produced by a procedure substantially similar to that of Comparative Example I except that the catalyst solution contained 0.19 mmol citric acid instead of tetrafluoroboric acid, the carrier particles had an average particle diameter of 200μ and a relative bulk density of 0.37 (K=7), the reaction temperature was 90° C. instead of 85° C. and the reaction time was 5 hours instead of 4 hours. The yield of copolymer was 40.3 g, obtained at a rate of 6.4 kg of copolymer/g Pd hr.

ILLUSTRATIVE EMBODIMENT VIII

A copolymer of carbon monoxide and ethylene was produced by a procedure substantially similar to that of Comparative Example I except that the carrier was silica particles having an average particle diameter of 100μ and a relative bulk density of 0.2 (K=3), and the reaction time was 6.1 hours instead of 4 hours. The product was 27.5 g of a mixture of the carbon monoxide/ethylene copolymer and silica. The copolymer was produced at a rate of 6.4 kg of copolymer/g Pd hr.

What is claimed is:

1. A supported catalyst comprising a catalyst composition formed by reacting a compound of palladium; an acid component present in an amount from 0.5 to 200 moles per mol of palladium, said acid component selected from the group consisting of (a) protic acid having a pKa of at least 2, (b) Lewis acid of the formula $MF_n$ wherein n is 3 or 5 and M is a trivalent or pentavalent element of Group III which forms a binary fluoride, or (c) a mixture of the Lewis acid and hydrogen halide; and a bidentate ligand selected from the group consisting of a bidentate ligand of nitrogen, a bidentate ligand of sulfur, and a bidentate ligand of phosphorous present in an amount of from 0.5 to 700 moles per tool of the palladium, said composition being supported on a solid particulate support which has a carrier index of below 30.

2. The catalyst of claim 1 wherein the palladium compound is palladium acetate.

3. The catalyst of claim 2 wherein the bidentate ligand is a phosphorus ligand represented by the formula

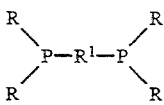

wherein R independently is hydrocarbyl or substituted hydrocarbyl of up to 10 carbon atoms inclusive and $R^1$ is a divalent bridging group of up to 10 carbon atoms inclusive with from 2 to 4 carbon atoms inclusive in the bridge.

4. The catalyst of claim 3 wherein R is aromatic and $R^1$ is 1,3-propylene.

5. The catalyst of claim 4 wherein the support is a linear alternating polymer of carbon monoxide and at least one ethylenically unsaturated hydrocarbon.

6. The catalyst of claim 5 wherein the acid component is protic acid.

7. The catalyst of claim 6 wherein the protic acid is citric acid.

8. The catalyst of claim 5 wherein the acid component is a mixture of Lewis acid and hydrogen fluoride.

9. The catalyst of claim 8 wherein the Lewis acid is boron trifluoride.

10. The catalyst of claim 9 wherein the phosphorus bidentate ligand is 1,3-bis(diphenylphosphino)propane or 1,3-bis[di(2-methoxyphenyl)phosphino]propane.

11. The catalyst of claim 10 wherein the ligand is 1,3-bis[di(2-methoxyphenyl)phosphino]propane.

* * * * *